(12) United States Patent
Schmidt et al.

(10) Patent No.: US 11,247,501 B2
(45) Date of Patent: Feb. 15, 2022

(54) LAYER-BY-LAYER ASSEMBLED MULTILAYER LAMINATION TRANSFER FILMS

(71) Applicant: 3M INNOVATIVE PROPERTIES COMPANY, St. Paul, MN (US)

(72) Inventors: Daniel J. Schmidt, Woodbury, MN (US); Mark J. Pellerite, Woodbury, MN (US); Martin B. Wolk, Woodbury, MN (US); Stephen A. Johnson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 667 days.

(21) Appl. No.: 14/470,298

(22) Filed: Aug. 27, 2014

(65) Prior Publication Data
US 2016/0059605 A1   Mar. 3, 2016

(51) Int. Cl.
*B41M 5/50* (2006.01)
*B44C 1/165* (2006.01)
*G02B 1/111* (2015.01)
*B29D 11/00* (2006.01)
*G02B 5/08* (2006.01)

(52) U.S. Cl.
CPC ......... *B41M 5/502* (2013.01); *B29D 11/0073* (2013.01); *B44C 1/165* (2013.01); *G02B 1/111* (2013.01); *G02B 5/0841* (2013.01)

(58) Field of Classification Search
CPC ......... B41M 5/502; B44C 1/165; G02B 1/11; G02B 5/0841; G02F 1/3618; G02F 2202/027; G03F 1/46
See application file for complete search history.

(56) References Cited

U.S. PATENT DOCUMENTS

| RE24,906 E | 12/1960 | Ulrich |
| 6,376,590 B2 | 4/2002 | Kolb |
| 6,396,079 B1 | 5/2002 | Hayashi |
| 6,582,807 B2 | 6/2003 | Baer |
| 7,241,437 B2 | 7/2007 | Davidson |
| 7,256,936 B2 | 8/2007 | Hebrink |
| 7,294,298 B2 | 11/2007 | Iijima |
| 8,234,998 B2 | 8/2012 | Krogman |
| 8,313,798 B2 | 11/2012 | Nogueira |
| 8,446,666 B2 | 5/2013 | Kurt |

(Continued)

FOREIGN PATENT DOCUMENTS

| EP | 1514679 | 3/2005 |
| JP | 2009-058703 | 3/2009 |

(Continued)

OTHER PUBLICATIONS

Caruso et al, "Production of Hollow Microspheres from Nanostructured Composite Particles," Oct. 13, 1999, American Chemical Society, Chem. Mater., Issue 11, pp. 3309-3314.*

(Continued)

*Primary Examiner* — Maria V Ewald
*Assistant Examiner* — Ethan Weydemeyer
(74) *Attorney, Agent, or Firm* — Jonathan L. Tolstedt

(57) ABSTRACT

Transfer films, articles made therewith, and layer-by-layer methods of making and using transfer films to form an inorganic optical stack are disclosed.

14 Claims, 4 Drawing Sheets

(56) References Cited

U.S. PATENT DOCUMENTS

| | | | |
|---|---|---|---|
| 2001/0046564 A1* | 11/2001 | Kotov | B01D 67/0069 427/430.1 |
| 2004/0149572 A1 | 8/2004 | Schlenoff | |
| 2004/0232394 A1* | 11/2004 | Khan | G02B 5/3016 252/585 |
| 2005/0141093 A1 | 6/2005 | Weber | |
| 2005/0221069 A1 | 10/2005 | Iijima | |
| 2006/0147614 A1* | 7/2006 | Mizuno | C03C 17/30 427/66 |
| 2010/0002402 A1* | 1/2010 | Rogers | H01L 21/4867 361/749 |
| 2010/0178480 A1 | 7/2010 | Colodrero Perez | |
| 2010/0272990 A1 | 10/2010 | Bondesan | |
| 2011/0014366 A1* | 1/2011 | Nogueira | G02B 5/208 427/162 |
| 2011/0149400 A1 | 6/2011 | Miguez Garcia | |
| 2014/0021492 A1 | 1/2014 | Wolk | |

FOREIGN PATENT DOCUMENTS

| | | |
|---|---|---|
| WO | WO 2013-052927 | 4/2013 |
| WO | WO 2014/099367 | 6/2014 |

OTHER PUBLICATIONS

Zhizhong Wu, et al "Deformable Antireflection Coatings from Polymer and Nanoparticle Multlayers," Advanced Materials, vol. 18, 20, Jun. 10, 2006, pp. 2699-2702.

Decher, "Fuzzy Nanoassemblies: Toward Layered Polymeric Multicomposites," Science, Aug. 29, 1997, vol. 277, pp. 1232-1237.

Gotschel, "Processing of preceramic paper and ceramic green tape derived multilayer structures," Advances in Applied Ceramics, 2013, vol. 112, No. 6, pp. 358-365.

Kim, "Effects of the Substrate Pretreatments on the Leakage Current in the Low-Temperature Poly-Si TFTs," Mat. Res. Soc. Symp. Proc., 1997, vol. 448, pp. 419-423.

Kondoh, "Surface treatment of sheet glass. Present status and future prospects," J. of Non-Crystalline Solids, 1994, vol. 178, pp. 189-198.

Krogman, "Industrial-scale spray layer-by-layer assembly for production of biomimetic photonic systems," Bioinspir. Biomim, Dec. 2013, vol. 8, No. 4, 11 pages.

Krogman, "Automated Process for Improved Uniformity and Versatility of Layer-by-Layer Deposition," Langmuir, 2007, vol. 23, No. 6, pp. 3137-3141.

Kurt, "Structural color via layer-by-layer deposition: layered nanoparticle arrays with near-UV and visible reflectivity bands," Journal of Materials Chemistry, 2009, vol. 19, No. 47, pp. 8920-8927.

Nicolaidis, "Forming of Ceramic Laminates Comprising Thin Layers of a Few Particles," J. Am. Ceram. Soc., Jul. 2008, vol. 91, No. 7, pp. 2124-2129.

Nogueira, "Spray-Layer-by-Layer Assembly Can More Rapidly Produce Optical-Quality Multistack Heterostructures," Langmuir, 2011, vol. 27, No. 12, pp. 7860-7867.

Park, "Multicomponent Patterning of Layer-by-Layer Assembled polyyelectrolyte/Nanoparticle Composite Thin Films with Controlled Alignment," Adv. Mater. 2005, vol. 17, pp. 2575-2579.

Seyer, "Layer-by-Layer Assembly of Multifunctional Hybrid Materials and Nanoscale Devices," Polymer Science: A Comprehensive Reference, 2012, vol. 7, pp. 159-185.

Sharmin, "Optimization of binder removal for ceramic microfabrication via polymer co-extrusion," Ceramics International, 2014, vol. 40, pp. 3939-3946.

Shimomura, "Layer-by-Layer-Assembled High-Performance Broadband Antireflection Coatings," ACS Applied Materials & Interfaces, 2010, vol. 2, No. 3, pp. 813-820.

Thomas, "Single-layer $TiO_2$ and multilayer $TiO_2$—$SiO_2$ optical coatings prepared from colloidal suspensions," Applied Optics, Nov. 1, 1987, vol. 26, No. 21, pp. 4688-4691.

Wang, "Patterning of Polymeric/Inorganic Nanocomposite and Nanoparticle Layers," Chem. Mater., 2002, vol. 14, No. 11, pp. 4812-4818.

Weber, "Giant Birefringent Optics in Multilayer Polymer Mirrors," Science, Mar. 31, 2000, vol. 287, pp. 2451-2456.

Wu, "Structural Color in Porous, Superhydrophilic, and Self-Cleaning $SiO_2$/$TiO_2$ Bragg Stacks," Small, 2007, vol. 3, No. 8, pp. 1445-1451.

Yu, "Titania Opal and Inverse Opal Structures via Templating Polyelectrolyte Multilayer Coated Polystyrene Spheres," Current Nanoscience, 2010, vol. 6, No. 2, pp. 206-212.

\* cited by examiner

LAYER-BY-LAYER ASSEMBLED MULTILAYER LAMINATION TRANSFER FILMS

BACKGROUND

Multilayer optical films (MOFs) have been made by co-extrusion of polymers. The final film can include a large number of alternating polymer layers of high and low refractive index and can be referred to as a Bragg reflector, or a 1-D photonic crystal. Light can be selectively reflected or transmitted at different wavelengths based on constructive interference from light reflected at the layer stack interfaces. MOFs have been designed primarily to reflect IR and/or visible light. Common polymers utilized in MOF include PEN, PMMA, co-PMMA, PET, co-PET and co-PEN.

Since MOFs are generally made with hydrocarbon polymers, there may be limitations to their photo-, thermal-, and chemical stability. Vacuum deposition (e.g. sputtering, evaporation, CVD, ALD), on the other hand, can be used to make inorganic, optical coatings with improved stability; however vacuum deposition requires costly equipment and generally suffers from low throughput.

SUMMARY

The present disclosure relates to layer-by-layer assembled multilayer lamination transfer films, methods of forming these lamination transfer films and method of using these lamination transfer films.

In one aspect, a transfer film includes a protolayer having a uniform thickness of less than 1 micrometer and including a plurality of sub-protolayer pairs. Each sub-protolayer pair independently includes a material with a first bonding group and a material with a complementary second bonding group. At least one of the materials is a thermally stable material.

In another aspect, a method includes laminating a transfer film, described herein, to a receptor substrate and baking out the sacrificial material in the protolayer(s) to form an optical stack having one or more layers.

In another aspect, a method of forming a transfer film includes depositing one or more co-extensive sub-protolayer pairs sequentially onto each other to form a protolayer. Each sub-protolayer pair comprising a material having a first bonding group and a material having a complementary second bonding group and at least one of the material is a thermally stable material. Each sub-protolayer pair is formed by layer-by-layer self-assembly.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
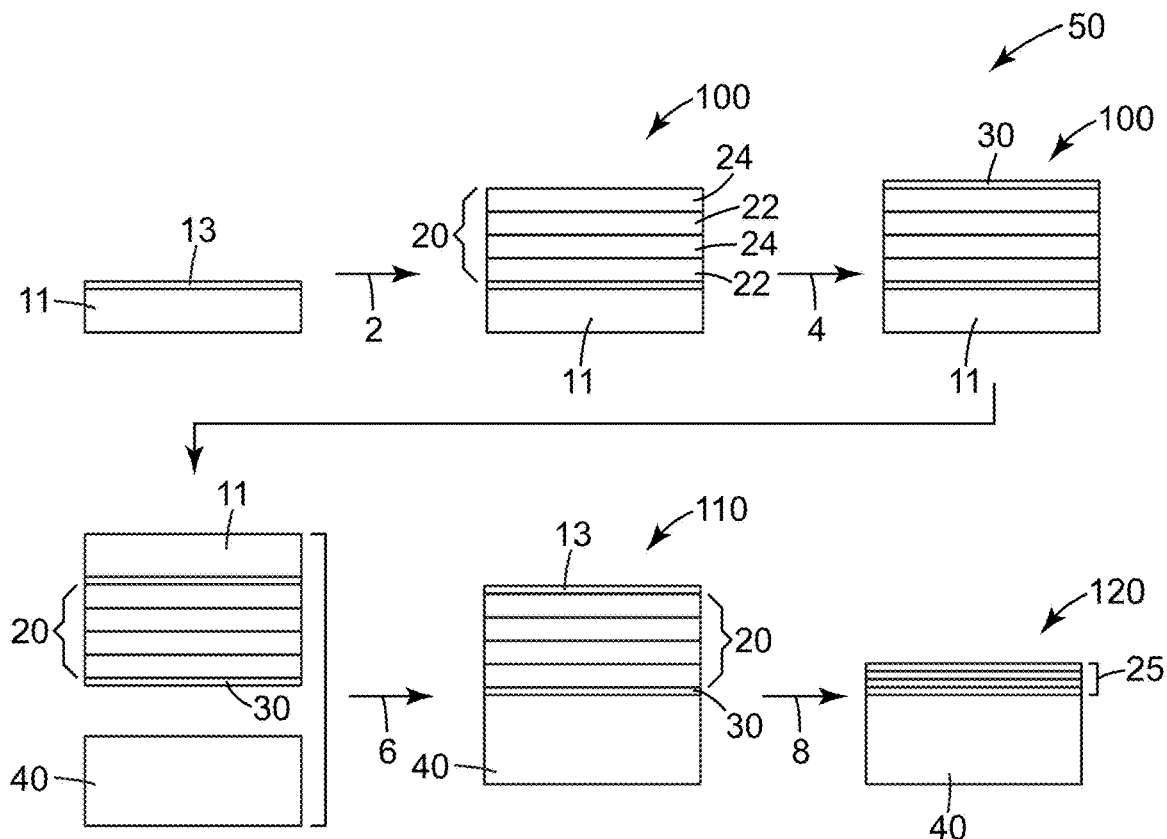
FIG. 1 is a schematic process flow diagram of an illustrative method of forming the transfer film and the optical stack.

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

In this disclosure:

"bake-out" refers to the process of substantially removing sacrificial material present in a layer by pyrolysis, combustion, sublimation, or vaporization;

"bake-out temperature" refers to the maximum temperature reached during the process of substantially removing sacrificial materials in a protolayer by pyrolysis, combustion, sublimation, or vaporization;

"combust" or "combustion" refers to a process of heating a layer that comprises organic materials in an oxidizing atmosphere so that organic materials undergo a chemical reaction with the oxidant;

"pyrolyze" or "pyrolysis" refers to a process of heating a sacrificial layer in an inert atmosphere so that organic materials in the article decompose;

"thermally stable" refers to materials that remain substantially intact during the removal of sacrificial materials, materials which can be densified and/or chemically transformed to form inorganic materials;

"densify" refers to the process by which the weight and/or volume fraction of the thermally stable material is increased during the bake-out process. For example, in a densified layer the local concentration (weight or volume %) of nanoparticles is increased relative to that in the protolayer. However, the average volume of the individual nanoparticles may not change as a result of the densification process.

"index of refraction," also referred to as "refractive index," "index," or "RI", refers to a refractive index of a material in the plane of the material with respect to light at 633 nm and normal or near normal (i.e. 8 degrees) incidence, unless otherwise indicated;

"high refractive index" and "low refractive index" are relative terms; when two layers are compared in both in-plane directions of interest, the layer that has a greater average in-plane refractive index is the high refractive index layer, and the layer that has a lower average in-plane refractive index is the low refractive index layer;

"polyelectrolyte" means a polymer with multiple ionic groups capable of electrostatic interaction. "Strong polyclectrolytes" possess permanent charges across a wide range of pH (e.g., polymers containing quaternary ammonium groups or sulfonic acid groups). "Weak polyelectrolytes" possess a pH-dependent level of charge (e.g. polymers containing primary, secondary, or tertiary amines, or carboxylic acids);

"bilayer" (or "bi-layer") generally refers to a thin film comprising a layer of a first material and a layer of a second material. As described herein, in some embodiments, a bilayer refers to the combination of a polycation layer and a polyanion layer. A polycation layer can comprise polycationic polymers and/or nanoparticles. Similarly, a polyanion layer can comprise polyanionic polymers and/or nanoparticles. As further described herein, in some embodiments bilayers are conveniently prepared using a layer-by-layer (LbL) self-assembly process;

"optical stack" refers to one or more layers that, alone or in combination, produce an optical effect over a range of wavelengths selected from 200 nm to 1 mm; and "optical protolayer stack" refers to one or more layers in the transfer film that are precursors to the optical stack in the final baked-out article, where the optical stack produces an optical effect over a range of wavelengths selected from 200 nm to 1 mm.

Unless specified otherwise, a "band" of electromagnetic radiation refers to any wavelength range or increment of at least 10 nm of electromagnetic radiation between 200 nm and 1 mm. A band may also be greater than 10 nm such as 25 nm, 50 nm, or 100 nm. As used herein, visible light refers to the band of wavelengths from 400 nm to 700 nm; ultraviolet (UV) refers to the band of wavelengths from 200 to 400 nm; UV-blue refers to the band of wavelengths from 350 to 490 nm; and near-infrared (near-IR) refers to the band of wavelengths from 700 to 1000 nm; all ranges being inclusive.

The present disclosure relates to multilayer lamination transfer films, methods of forming these lamination transfer films, and methods of using these lamination transfer films. These inorganic multilayer lamination transfer films have alternating layers including inorganic nanoparticles, sacrificial materials and optional inorganic precursors that can be formed by a layer-by-layer (LbL) self-assembly coating method. This transfer film is then laminated to a receptor substrate such as glass for example, any backing is peeled away, and the laminated receptor substrate is baked at high temperature (e.g. 500° C.) to remove the sacrificial, organic material. The result is an inorganic optical coating or optical stack (e.g. anti-reflective or Bragg reflector, such as a UV reflector, visible light reflector, dichroic mirror, dielectric mirror, or infrared (IR) reflector) on the receptor substrate. This approach is particularly suited to film-intolerant applications where photo-, thermal-, or chemical stability is preferred. While the present disclosure is not so limited, an appreciation of various aspects of the disclosure will be gained through a discussion of the examples provided below.

The LbL coating method described herein utilizes sequential, self-limiting adsorption of materials with complementary functional groups, such as, positively and negatively charged polymers (e.g. polyelectrolytes), for example, and nanoparticles. The technique allows for nanoscale control over coating thickness and composition and the process can be accomplished in an ambient environment under mild conditions (e.g., aqueous). A rinse step is performed between each layer (i.e., sub-protolayer) coating step.

This disclosure solves the problems of providing low capital expense, high throughput, optical coating technology for glass substrates but in film form with the coating having improved photo-, thermal-, and chemical stability relative to those containing organic material. Described herein is a spray layer-by-layer coating to fabricate a transfer film that can be laminated to a high temperature stable substrate (e.g., glass) and then baked to provide an optical coating fully integrated with the substrate (e.g., glass). Such a transfer film could be used by glass or light substrate manufacturers, for example, to provide antireflection (AR) functionality for display glass, IR reflection for thermal management, or UV reflection to protect organic materials from degradation, as just some examples.

Figure 2:
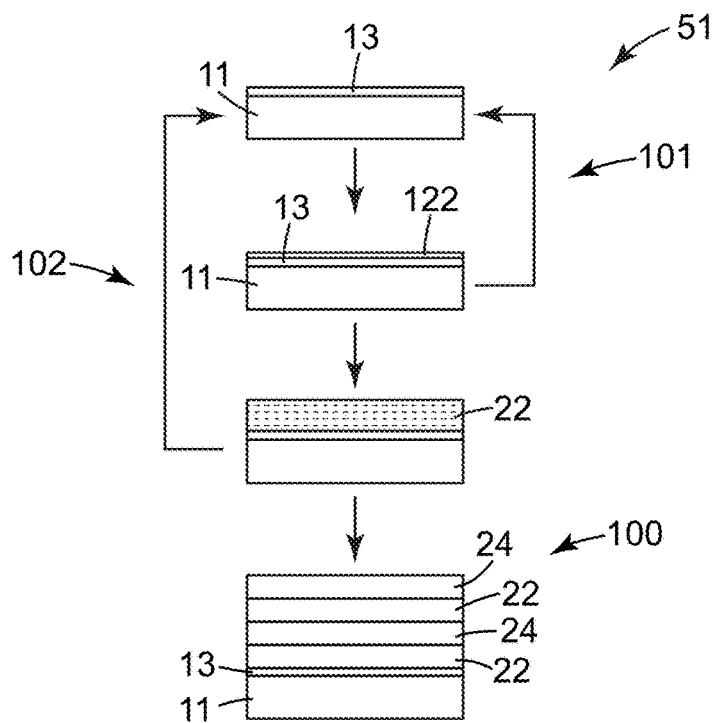
FIG. 2 is a schematic process flow diagram of an illustrative method of forming the protolayers of the transfer film via layer-by-layer processing.

FIG. 1 is a schematic process flow diagram 50 of an illustrative method of forming the transfer film 100 and the optical stack 25. FIG. 2 is a schematic process flow diagram 51 of an illustrative method of forming the protolayers 22, 24 of the transfer film 100 via layer-by-layer (LbL) processing.

The transfer film 100 includes one or a plurality of co-extensive layers (or protolayers) 22 and 24 forming a protolayer stack 20. Each layer 22 and 24 independently includes a sacrificial material and a thermally stable material and a generally uniform co-extensive thickness. In many embodiments the protolayers 22 and 24 each have a uniform thickness of less than 1 micrometer or less than 500 nanometers or less than 250 nanometers or less than 150 nanometers or are in a range from 10 to 500 nanometers.

The protolayer stack 20 and resulting optical stack 25 can be formed of any number of protolayers such as 1, 2, 3, 4, 5, 6, 7, 8, 9, 10, 11 or more than 11. In many embodiments the protolayer stack 20 and resulting optical stack 25 have 25 layers or less. With many layers the transmission spectrum can be tailored to meet specific transmission or reflection requirements for a range of bandwidth of electromagnetic radiation. In many embodiments, the protolayer stack 20 and resulting optical stack 25 have a visible light transmittance of at least 5%, or at least 10%, or at least 25%, or at least 50%, or at least 75%, or at least 90%. In various embodiments the individual layers of the resulting optical stack 25 cooperate to reflect at least 50% or 75% or 90% visible, IR or UV light or a band of visible, IR or UV light.

Each protolayer 22 and/or 24 includes a plurality of sub-protolayer pairs (as illustrated in FIG. 2). Each sub-protolayer pair independently includes a material having a first bonding group and a material having a complementary second bonding group and one of those materials includes a thermally stable material. Each sub-protolayer pair has a uniform thickness of less than 1 micrometer or less than 500 nanometers or less than 250 nanometers or less than 150 nanometers or in a range of 10 to 500 nanometers, or in a range of 5 to 50 nanometers, or in a rage from 1 to 20 nanometers. The number of sub-protolayer pairs in each protolayer is typically at least 1, 2, 3, 4, 5, 6, 7, 8, 9, 10, or greater than 10. In many embodiments the number of sub-protolayer pairs in each protolayer is 50 or less. The thermally stable material can be present in each protolayer in at least 50 wt %, or at least 60 wt %, or at least 70 wt %, or at least 80 wt %, or at least 90 wt %.

Each sub-protolayer pair is deposited by what is commonly referred to as a "layer-by-layer self-assembly process". This process is used to assemble thin films or coatings of oppositely charged polymers (i.e., polyelectrolytes) and/or nanoparticles electrostatically, but other functionalities such as hydrogen bond donors/acceptors, metal ions/ligands, and covalent bonding moieties can be the driving force for thin film assembly. This deposition process can involve exposing the substrate having a surface charge, to a series of liquid solutions, or baths. This can be accomplished by immersion of the substrate into liquid baths (also referred to as dip coating), spraying, spin coating, roll coating, inkjet printing, and the like. Exposure to the first polyion (e.g. bath) liquid solution, which has charge opposite that of the substrate, results in charged species near the substrate surface adsorbing quickly, establishing a concentration gradient, and drawing more polyelectrolyte from the bulk solution to the surface. Further adsorption occurs until a sufficient layer has developed to mask the underlying charge and reverse the net charge of the substrate surface. In order for mass transfer and adsorption to occur, this exposure time is typically on the order of seconds to minutes. The substrate is then removed from the first polyion (e.g. bath) liquid solution, and is then exposed to a series of water rinse baths to remove any physically entangled or loosely bound polyelectrolyte. Following these rinse (e.g. bath) liquid solutions, the substrate is then exposed to a second polyion (e.g. bath) liquid solution, which has charge opposite that of the first polyion (e.g. bath) liquid solution. Once again adsorption occurs, since the surface charge of the substrate is opposite that of the second (e.g. bath) liquid solution. Continued exposure to the second polyion (e.g. bath) liquid solution then results in a reversal of the surface charge of the substrate. A subsequent rinsing can be performed to complete the cycle. This sequence of steps is said to build up one layer pair, also referred to herein as a "bi-layer" or "sub-protolayer pair" of deposition and can be repeated as desired to add further layer pairs to the substrate. Some examples of suitable processes include those described in Krogman et al., U.S. Pat. No. 8,234,998; and Nogueira et al., U.S. Pat. No. 8,313,798.

The term "complementary" refers to the first binding group and the second binding group together forming a binding pair. A binding pair forms a non-covalent chemical bond which may be selected from an ionic bond, a hydrogen bond, hydrophobic interaction, a Van der Waals interaction, an affinity bond (e.g. antibody-antigen bond, avidin-biotin bond, etc.), etc. The first binding group may be an ionic group, a hydrogen bond donor, or a hydrogen bond acceptor, or a precursor of any such group, wherein a precursor is a group that can be converted to an ionic group, hydrogen donor, or hydrogen acceptor, for example upon a change in environmental conditions or upon reaction with an activating agent.

Protolayers 22, 24 include inorganic nanomaterials and a sacrificial material. The inorganic nanomaterial can be a metal oxide nanoparticle (e.g. silica, titania, zirconia), for example, or a precursor thereof. An example precursor is the water-stable titania precursor, titanium (IV) bis(ammonium lactate). The sacrificial material is the polymer (or polymers) with complementary binding to the inorganic nanomaterial. The materials having the first bonding group and the complementary second bonding group include polyanionic material and polycationic material in some examples and hydrogen bond donor material and hydrogen bond acceptor material in other examples. Polymers, nanoparticles, and small molecules can be referred to as "polyanionic" or "polycationic" if they contain a plurality of negative or positive ionic charged sites, respectively.

When electrostatic interactions are used to form the LbL coating, the sacrificial material is a polyelectrolyte material or polymer. Typical polycationic material or polymers include linear and branched poly(ethyleneimine), poly(allylamine hydrochloride), polyvinylamine, chitosan, polyamidoamine, and poly(vinylbenzyltrimethylamine). Typical polyanionic materials or polymers include poly (styrene sulfonic acid), poly(vinyl sulfate), poly(vinyl sulfonate), poly(acrylic acid), poly(methacrylic acid), dextran sulfate, heparin, hyaluronic acid, carrageenan, carboxymethylcellulose, alginate, sulfonated tetrafluoroethylene based fluoropolymers such as Nafion®, poly (vinylphosphoric acid), poly(vinylphosphonic acid), and sodium hexametaphosphate. The molecular weight of the polyelectrolyte can vary, ranging from about 1,000 g/mole to about 1,000,000 g/mole. In some embodiments, the molecular weight (Mw) of the (e.g. PDAC) positively charged cationic layer ranges from 100,000 g/mole to 200,000 g/mole. Generally either the acid or salt form of a polyelectrolyte is listed above, but it is understood that the two forms will exist in equilibrium according to the dissociation constant ($K_a$) for the acid or ($K_b$) for the base.

It is possible to use hydrogen bonding as the mechanism of LbL coating. In this case, the sacrificial material is a hydrogen bond donating polymer (e.g. poly(acrylic acid), poly(methacrylic acid), polyvinyl alcohol) or a hydrogen bond accepting polymer (e.g. polyethyleneoxide, polyvinylpyrrolidone). A hydrogen bond is a relatively weak secondary interaction between a hydrogen atom bound to a more electronegative atom and another atom that is also generally more electronegative than hydrogen and has one or more lone electron pairs, enabling it to act as a base. Hydrogen bond donors are moieties that contain at least one hydrogen atom that may participate in hydrogen bond formation, and a more electronegative atom bound to the hydrogen atom. Examples of these moieties include, preferably. O—H and N—H, and less preferably, P—H, S—H. The moiety C—H may also, less preferably, be a hydrogen bond donor, when the carbon atom is bound to another atom through a triple bond, when the carbon atom is bound through a double bond to O, or when the carbon atom is bound to at least two atoms selected from O, F, Cl and Br. Hydrogen bond acceptors are moieties that contain an atom more electronegative than hydrogen that also has a lone pair of electrons. Examples of these atoms include preferably N, O and F, and less preferably Cl, Br, I, S and P. Examples of hydrogen bond acceptor moieties include C═O, O—H, N—H, C—F, P═O and C≡N. Useful LbL material utilizing hydrogen bonding include polymers containing hydrogen bond donors and/or hydrogen bond acceptors, for example polycarboxylic acids such polyacrylic acid and polymethacrylic acid; polynucleotides such as poly(adenylic acid), poly(uridylic acid), poly(cytidylic acid), poly(uridylic acid) and poly(inosinic acid); polymers of vinyl nucleic acids such as poly(vinyladenine); polyamino acids such as polyglutamic acid and poly($\in$-N-carbobenzoxy-L-lysine); polyalcohols such as poly(vinyl alcohol); polyethers such as poly(ethylene oxide), poly(1,2-dimethoxyethylene), poly(vinylmethyl ether), and poly(vinylbenzo-18-crown-6); polyketones and polyaldehydes such as poly vinyl butyral and poly(N-vinyl-2-pyrrolidone); polyacrylamides such as polyacrylamide, polymethacrylamide and poly(N-isopropylacrylamide); polyamines such as poly(4-amine)styrene; polyesters such poly(cyclohexane-1,4-dimethylene terephthalate) and polyhydroxy methyl acrylate; polyphosphazenes such as poly(bis(methylamino)phosphazene) and poly(bis(methoxyethoxyethoxy)phosphazene; polysaccharides such as carboxymethyl cellulose; and copolymers thereof.

The process of depositing multiple protolayers via LbL is illustrated in FIG. 2. A polymeric support layer or carrier film 11 with a releasable surface 13 is sprayed with a material with a first bonding group (e.g., cationic polymer), rinsed, and then sprayed with a material with a complementary second bonding group (e.g., anionic nanoparticle), and rinsed to give a "bi-layer" or "sub-protolayer pair" 122, which is the fundamental unit of an LbL coating. Multiple bi-layers are deposited to build up the protolayer thickness to the target value (recycle step 101). Once the protolayer 22 thickness target has been reached, the spray, rinse, spray, rinse process is repeated for the second protolayer (recycle step 102).

As an illustrative example, an ABABAB coating in which the A protolayers comprise silica nanoparticles and a polycationic polymer and the B protolayers comprise titania nanoparticles and a polycationic polymer may require five bi-layers per A protolayer and seven bi-layers per B protolayer, or twelve bi-layers per protolayer dyad (AB). The entire coating would require 3*12=36 bi-layers, requiring 72 spray-rinse cycles. After lamination transfer and bake-out, the A and B protolayers are converted to A and B low and high refractive index layers, respectively.

The formulation of each protolayer 22 and 24 is tailored to provide different properties in the final baked-out optical stack. In many embodiments the one or more first protolayers 22 have sacrificial material and a first thermally stable material and the one or more second protolayers 24 have sacrificial material and a second thermally stable material. The first and second thermally stable materials are different materials or different kinds of materials having different physical or optical properties. For example, the formulation of a first protolayer 22 can have thermally stable material or a precursor to a thermally stable material that has a different refractive index (by at least 0.1 or at least 0.2 or at least 0.3 or at least 0.4, for example) than the thermally stable material of a second protolayer 24. Examples of these different kinds of materials include inorganic nanomaterials such as silica and titania, as exemplified in the examples below. The sacrificial material in the first protolayer can be the same as that in the second protolayer or different from that in the second protolayer.

While the protolayer stack 20 is illustrated having four layers of alternating layer formulations 22 and 24 (or A and B), it is understood that protolayer stack 20 can have three different layer formulations A, B and C or four different layer formulations A, B, C and D. In many embodiments the protolayer stack 20 has repeating units such as dyads 22 and 24 (or A and B) or triads A, B, C or quads A, B, C and D. These repeating unit protolayer stacks 20 can have 1, 2, 3, 4, 5, 6, 7, 8, 9, 10 or more repeating units.

In one embodiment the protolayer stack 20 utilizes four layer formulations A, B, C, D in a six protolayer stack or repeating six layer sequence of CACDBD. This arrangement is illustrated and described for a multilayer optical interference reflecting film in US 2005/0141093. The thickness of each protolayer and subsequent baked out optical layer can be tailored to suppress higher order light reflections.

The protolayer stack 20 can be deposited or formed on a polymeric support layer or carrier layer 11 having a releasable surface 13. The polymeric support layer or carrier layer 11 can be implemented with a thermally stable flexible film providing mechanical support for the protolayer stack 20. The polymeric support layer 11 has a releasable surface 13, meaning the polymeric support layer 11 allows for release of protolayer stack 20 applied to the releasable surface 13. The polymeric support layer or carrier layer 11 can be thermally stable above 70° C., or alternatively above 120° C. One example of a carrier film is polyethylene terephthalate (PET).

Various polymeric film substrates comprised of various thermosetting or thermoplastic polymers are suitable for use as the polymeric support layer or carrier layer 11. The polymeric support layer or carrier layer 11 may be a single layer or multi-layer film. Illustrative examples of polymers that may be employed as the carrier layer film include (1) fluorinated polymers such as poly(chlorotrifluoroethylene), poly(tetrafluoroethylene-co-hexafluoropropylene), poly(tetrafluoroethylene-co-perfluoro(alkyl)vinylether), poly(vinylidene fluoride-co-hexafluoropropylene); (2) ionomeric ethylene copolymers poly(ethylene-co-methacrylic acid) with sodium or zinc ions such as SURLYN-8920 Brand and SURLYN-9910 Brand available from E.I. duPont de Nemours, Wilmington. Del.; (3) low density polyolefins such as low density polyethylene; linear low density polyethylene; and very low density polyethylene; plasticized vinyl halide polymers such as plasticized poly(vinylchloride); (4) polyethylene copolymers including acid functional polymers such as poly(ethylene-co-acrylic acid) "EAA", poly(ethylene-co-methacrylic acid) "EMA", poly(ethylene-co-maleic acid), and poly(ethylene-co-fumaric acid): acrylic functional polymers such as poly(ethylene-co-alkylacrylates) where the alkyl group is methyl, ethyl, propyl, butyl, and the like, or $CH_3(CH_2)_n$— where n is 0 to 12, and poly(ethylene-co-vinylacetate) "EVA"; and (5) (e.g.) aliphatic polyurethanes. The polymeric support layer or carrier layer 11 can be an olefinic polymeric material, typically comprising at least 50 wt % of an alkylene having 2 to 8 carbon atoms with ethylene and propylene being most commonly employed. Other polymeric support layers or carrier layers II include for example poly(ethylene naphthalate), polycarbonate, poly (meth)acrylate (e.g., polymethyl methacrylate or "PMMA"), polyolefin (e.g., polypropylene or "PP"), polyesters (e.g., polyethylene terephthalate or "PET"), polyamides, polyimides. phenolic resins, cellulose diacetate, cellulose triacetate (TAC), polystyrene, styrene-acrylonitrile copolymers, cyclic olefin copolymers, epoxies, and the like. In some embodiments, the polymeric support layer or carrier layer 11 can include paper, release-coated paper, non-wovens, wovens (fabric), metal films, and metal foils.

In some embodiments, the polymeric support layer or carrier layer 11 can include sacrificial materials that can remain on the protolayer stack 20 during the transfer process. For example, the polymeric support layer or carrier layer 11 can include a PMMA release layer on a PET layer where the release layer remains on the protolayer stack 20 following release from the PET layer. Sacrificial materials (such as the PMMA release layer), can be pyrolyzed by subjecting them to thermal conditions that can vaporize or decompose to volatile byproducts substantially all of the organic material present in the sacrificial layers. In these cases the layer can be called a sacrificial release layer. These sacrificial layers can also be subjected to combustion to burn out all of the organic material present in the sacrificial layer. Typically, a clear, high-purity polymer, such as poly(methyl methacrylate), or poly(ethyl acrylate-co-methyl methacrylate)(referred to as co-PMMA), can be used as the sacrificial material. Useful sacrificial materials leave very low organic residues (ash) after pyrolysis or combustion at the bake out temperature, typically less than 1 wt % residues.

The protolayer stack 20 is formed and disposed on (arrow 2) the support layer or carrier layer 11 by the LbL method described herein. The protolayer stack 20 is formed by sequentially forming each layer 22, 24 on each other. A sacrificial adhesive layer 30 can be applied to or disposed on (arrow 4) the protolayer stack 20 to assist in adhering the protolayer stack 20 to the receptor substrate 40 during the lamination process (arrow 6). This laminated transfer film/receptor substrate article 110 can then be baked out (arrow 8) to remove the sacrificial material 23 in the protolayers 22, 24. The resulting baked out article is an optical stack 25. Sacrificial adhesive 30 and any release material 13 can be baked out also leaving the optical stack 25 fixed to the receptor substrate 40.

Examples of receptor substrates 40 include glass such as display mother glass (e.g., backplane mother glass), display cover glass, lighting mother glass, architectural glass, roll glass, and flexible glass. An example of flexible roll glass is commercially available under the trade designation WILLOW glass from Corning Incorporated (Corning, N.Y.). Other examples of receptor substrates include metals such as metal parts, sheets and foils. Yet other examples of receptor substrates include gallium nitride, sapphire, silicon, silica, and silicon carbide. In many embodiments the receptor substrates 40 is glass, quartz or sapphire. The receptor substrates 40 can be flat, or curved.

Display backplane mother glass receptor substrates can optionally include a buffer layer on a side of the receptor substrate to which a lamination transfer film is applied. Examples of buffer layers are described in U.S. Pat. No. 6,396,079, which is incorporated herein by reference as if fully set forth. One type of buffer layer is a thin layer of $SiO_2$, as described in K. Kondoh et al., J. of Non-Crystalline Solids 178 (1994) 189-98 and T-K. Kim et al., Mat. Res. Soc. Symp. Proc. Vol. 448 (1997) 419-23, both of which are incorporated herein by reference as if fully set forth.

A particular advantage of the transfer films and methods described herein is the ability to impart an optical stack to substrates with large surface areas, such as display mother glass or architectural glass. The transfer films 100 described herein have large enough dimensions to be used to impart an optical stack over, at least, entire large digital display substrates (e.g., a 55 inch diagonal AMOLED HDTV, with dimensions of 52 inches wide by 31.4 inches tall), for example.

The sacrificial material in each layer of the protolayer stack 20 can be cleanly baked out leaving a thermally stable material defining each layer of the optical stack 25. In some embodiments, the thermally stable material can completely or partially fuse into a glass-like material.

Thermally Stable Material

A thermally stable material is utilized to form the optical coating or stack. The thermally stable material includes thermally stable molecular species, for example. It is understood that the thermally stable material includes precursor materials that either are or transform into materials that remain substantially intact during the removal of sacrificial materials, such as during "bake out" or pyrolysis. Thermally stable materials may include inorganic nanoparticles, and optionally polysiloxanes and inorganic residues derived from chemical precursors of inorganic materials.

These nanoparticles can be of various sizes and shapes. The nanoparticles can have an average particle diameter less than about 1000 nm, less than about 500 nm, less than about 250 nm, less than about 100 nm, less than about 50 nm, or less than about 35 nm. The nanoparticles can have an average particle diameter from about 3 nm to about 50 nm, or from about 3 nm to about 35 nm, or from about 5 nm to about 25 nm. If the nanoparticles are aggregated, the maximum cross sectional dimension of the aggregated particle can be within any of these ranges, and can also be greater than about 100 nm. "Fumed" nanoparticles such as silica and alumina, with primary size less than about 50 nm, may also be used, such as CAB-O-SPERSE PG 002 fumed silica, CAB-O-SPERSE 2017A fumed silica, and CAB-O-SPERSE-PG 003 fumed alumina, available from Cabot Co. Boston, Mass. Their measurements can be based on transmission electron microscopy (TEM). Nanoparticles can be substantially fully condensed. Fully condensed nanoparticles, such as the colloidal silicas, typically have substantially no hydroxyls in their interiors. Non-silica containing fully condensed nanoparticles typically have a degree of crystallinity (measured as isolated particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index. Various shapes of the inorganic nanoparticles may be used, such as sphere, rod, sheet, tube, wire, cube, cone, tetrahedron, and the like.

The size of the particles can be chosen to avoid significant visible light scattering in the final article. The nanomaterial selected can impart various optical properties (i.e refractive index, birefringence), electrical properties (e.g conductivity), mechanical properties (e.g toughness, pencil hardness, scratch resistance) or a combination of these properties.

Examples of suitable inorganic nanoparticles include metal nanoparticles or their respective oxides, including the elements zirconium (Zr), titanium (Ti), hafnium (Hf), aluminum (Al), iron (Fe), vanadium (V), antimony (Sb), tin (Sn), gold (Au), copper (Cu), gallium (Ga), indium (In), chromium (Cr), manganese (Mn), cobalt (Co), nickel (Ni), zinc (Zn), yttrium (Y), niobium (Nb), molybdenum (Mo), technetium (Te), ruthenium (Ru), rhodium (Rh), palladium (Pd), silver (Ag), cadmium (Cd), lanthanum (La), tantalum (Ta), tungsten (W), rhenium (Rh), osmium (Os), iridium (Ir), platinum (Pt), cerium (Cce), strontium (Sr) and any combinations thereof (indium tin oxide, for example).

Further examples of suitable inorganic nanoparticles include fluorides such as, magnesium fluoride, calcium fluoride, lead fluoride, aluminum fluoride and barium fluoride. Further examples of suitable inorganic nanoparticles include nitrides such as silicon nitride. Further examples of suitable inorganic nanoparticles include titanates such as, strontium titanate, barium titanate and barium strontium titanate. Further examples of suitable inorganic nanoparticles include mixed metal oxides (for example, aluminosilicates), mixed metal fluorides, mixed nitrides, and mixed metal titanates.

In a preferred embodiment, nanoparticles of titanium dioxide (titania) are used. Titania nanoparticles can have a particle size from approximately 5 nm to 50 nm, or 5 nm to 15 nm, or 10 nm. Various forms of titania can be utilized including anatase, brookite, rutile and amorphous forms. Anatase titania nanoparticles (5-15 nm diameter) are commercially available from U.S. Research Nanomaterials, Houston, Tex. as an aqueous suspension at 15 wt %/o. Titania sols are also available dispersed in strong acid or base condition from Ishihara Sangyo Kaisha Ltd. (Osaka, Japan). Titania sols are also available under product code X500 from Titan PE (Shanghai, China). Titania has an isoelectric point at about pH 4-6 and thus can be used as a polyanion in layer-by-layer self-assembly at pH greater than 6, preferably pH greater than 7, more preferably pH greater than 8, or the polycation in layer-by-layer self-assembly at pH less than 4, more preferably pH less than 3.

In another preferred embodiment, nanoparticles of zirconium oxide (zirconia) are used. Zirconia nanoparticles can have a particle size from approximately 5 nm to 100 nm, or 5 nm to 15 nm, or 10 nm. Zirconias are commercially available from Nalco Chemical Co. (Naperville, Ill.) under the product designation NALCO OOSSOO8 and from Buhler AG Uzwil, 20 Switzerland under the trade designation "Buhler zirconia Z-WO sol". Zirconia nanoparticles can also be prepared such as described in U.S. Pat. No. 7,241,437 (Davidson et al.) and U.S. Pat. No. 6,376,590 (Kolb et al.). Titania, antimony oxides, alumina, tin oxides, and/or mixed metal oxide nanoparticles can be present in the protolayers or optical stack Other examples of suitable inorganic nanoparticles include elements and alloys known as semiconductors and their respective oxides such as silicon (Si), germanium (Ge), silicon carbide (SiC), silicon germanide (SiGe), aluminium nitride (AlN), aluminium phosphide (AlP), boron nitride (BN), boron carbide ($B_4C$), gallium antimonide (GaSb), indium phosphide (InP), gallium arsenide nitride (GaAsN), gallium arsenide phosphide (GaAsP), indium aluminum arsenide nitride (InAlAsN), zinc oxide (ZnO), zinc selenide (ZnSe), zinc sulfide (ZnS), zinc telluride (ZnTe), mercury zinc selenide (HgZnSe), lead sulfide (PbS), lead telluride (PbTe), tin sulfide (SnS), lead tin telluride (PbSnTe), thallium tin telluride ($Tl_2SnTe_5$), zinc phosphide ($Zn_3P_2$), zinc arsenide ($Zn_3As_2$), zinc antimonide ($Zn_3Sb_2$), lead (II) iodide ($PbI_2$), copper(I) oxide ($Cu_2O$).

Silicon dioxide (silica) nanoparticles can have a particle size from 5 nm to 75 nm or 10 nm to 30 nm or 20 nm. Suitable silicas are commercially available from Nalco Chemical Co. (Naperville, Ill.) under the trade designation NALCO COLLOIDAL SILICAS. For example, silicas include NALCO trade designations 1040, 1042, 1050, 1060, 2327 and 2329. Organosilica is also available under the product names IPA-ST-MS, IPA-ST-L, IPA-ST, IPA-ST-UP, MT-ST-M, and MA-ST from Nissan Chemical America Co. Houston, Tex. and the SNOWTEX ST-40, ST-50, ST-20L, ST-C, ST-N, ST-O, ST-OL, ST-ZL, ST-UP, and ST-OUP, also from Nissan Chemical America Co. Houston, Tex. Suitable fumed silicas include for example, products sold under the tradename, AEROSIL series OX-50, -130, -150, and -200 available from Evonik AG, (Essen, Germany), and CAB-O-SPERSE 2095, CAB-O-SPERSE A 105, CAB-O-SIL M5 available from Cabot Corp. (Tuscola, Ill.).

It is appreciated that unmodified silica nanoparticles commonly comprise hydroxyl or silanol functional groups on the nanoparticle surface, particularly when the nanoparticles are provided in the form of an aqueous dispersion. Aqueous dispersions of silica nanoparticles can also be ammonium or sodium stabilized. Silica has an isoelectric point at about pH 2 and can thus be used as a polyanion in the layer-by-layer self-assembly process at pH values greater than 2, more preferably at pH values greater than or equal to 3.

Examples of suitable inorganic nanoparticles include elements known as rare earth elements and their oxides, such as lanthanum (La), cerium ($CeO_2$), praseodymium ($Pr_6O_{11}$), neodymium ($Nd_2O_3$), samarium ($Sm_2O_3$), europium ($Eu_2O_3$), gadolinium ($Gd_2O_3$), terbium ($Tb_4O_7$), dysprosium ($Dy_2O_3$), holmium ($Ho_2O_3$), erbium ($Er_2O_3$), thulium ($Tm_2O_3$), ytterbium ($Yb_2O_3$) and lutetium ($Lu_2O_3$) oxides.

The nanoparticles can be treated with a surface treatment agent. Surface-treating the nano-sized particles can provide improved stability of the nanoparticles in the coating solution and/or altered packing density in the LbL coating. Surface-treating the nanoparticle may be required to impart a binding group, such as an ionic group or hydrogen bonding group, such that the nanoparticle may be utilized in a layer-by-layer self-assembly process. In general, a surface treatment agent has a first end that will attach to the particle surface (covalently, ionically or through strong physisorption) and the second end imparts a desired functionality to the particle surface. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and for other siliceous fillers. Phosphonic acids and carboxylic acids are preferred for metal oxides such as zirconia and titania. The required amount of surface modifier is dependent upon several factors such as particle size, particle type, modifier molecular weight, and modifier type. In general it is preferred that approximately a monolayer of modifier is attached to the surface of the particle. The attachment procedure or reaction conditions required also depend on the surface modifier used. For silanes, it is preferred to surface treat at elevated temperatures under acidic or basic conditions for from about 1-24 hr. Surface treatment agents such as carboxylic acids may not require elevated temperatures or extended time.

Representative embodiments of surface treatment agents suitable for the compositions include compounds such as, for example, 3-aminopropyl triethoxy silane, 3-aminopropyl trimethoxy silane, and 1-hydroxyethane-1,1,-diphosphonic acid.

Sacrificial Adhesive Layer

The sacrificial adhesive layer can be implemented with any material enhancing adhesion of the transfer film to the receptor substrate without substantially adversely affecting the performance of the transfer film. This layer can also be described as an adhesion promoting layer. The sacrificial adhesive layer appears to facilitate the final permanent bond between the receptor substrate and the baked-out thermally stable structure. The sacrificial adhesive layer is capable of being cleanly baked out during the methods described herein.

Useful sacrificial adhesives or adhesion promoting materials include photoresists (positive and negative), self-assembled monolayers, silane coupling agents, and macromolecules. In some embodiments, silsesquioxanes can function as adhesion promoting layers. Other exemplary materials may include benzocyclobutenes, polyimides, polyamides, silicones, polysiloxanes, silicone hybrid polymers, (meth) acrylates, and other silanes or macromolecules functionalized with a wide variety of reactive groups such as epoxide, episulfide, vinyl, hydroxyl, allyloxy, (meth)acrylate, isocyanate, cyanoester, acetoxy, (meth)acrylamide, thiol, silanol, carboxylic acid, amino, vinyl ether, phenolic, aldehyde, alkyl halide, cinnamate, azide, aziridine, alkene, carbamates, imide, amide, alkyne, and any derivatives or combinations of these groups.

The final optical stacks can forma any useful optical element, including, but not limited to, the following. Bragg reflectors, also known as 1-D photonic crystals, are generally understood to those of skill in the art to at least partially reflect light within a desired band of wavelengths by employing alternating high and low refractive index layers. The interfaces between layers with different RIs produce phased reflections, selectively reinforcing certain wavelengths (constructive interference) and cancelling other wavelengths (destructive interference). By selecting certain variables such as layer thickness, refractive indices, and number of the layers, the band(s) of reflected and/or transmitted wavelengths can be tuned and made as wide or as narrow as desired.

The physical principles by which antireflection films and coatings function are known. AR coatings are often constructed of alternating high and low refractive index ("RI") layers of the correct optical thickness. Optical thickness "t" is defined as:

$$t=nd \quad (1)$$

where n is the refractive index and d is the actual physical thickness of the stack. With regards to visible light, this thickness is on the order of one-quarter of the wavelength of the light to be reflected. The human eye is most sensitive to light around 550 nm. Therefore it is desirable to design the low and high index coating thicknesses in a manner that minimizes the amount of reflected light in this optical range. An anti-reflective coating can consist of a single, quarter-wave layer or can comprise one or more low refractive index layers and one or more high refractive index layers.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all parts, percentages, ratios, etc., in the examples and in the remainder of the specification are by weight. Unless otherwise noted, all chemicals were obtained from, or are available from, chemical suppliers such as Sigma-Aldrich Co., St. Louis, Mo.

The following is a list of materials used throughout the Examples, as well as their brief descriptions and origins.

"PDADMAC" refers to poly(diallyl-dimethyl ammonium chloride), a positively charged polymer with molecular weight 100-200K, obtained as a 20 wt % solution in water from Sigma-Aldrich Co., St. Louis, Mo.

"$SiO_2$", unless otherwise specified, refers to silica nanoparticles (20-24 nm diameter, ammonium stabilized), obtained from Sigma-Aldrich Co., St. Louis, Mo. as a 40 wt % aqueous dispersion under the trade designation "Ludox AS-40".

"$TiO_2$" refers to anionic anatase titania nanoparticles obtained as a 10 wt % suspension in water from Sigma-Aldrich Co., St. Louis, Mo. under trade designation "TiMaKs-W 10.1" available by special order (product #Q52940, lot #SHBD2327V).

"TMAOH" refers to tetramethylammonium hydroxide, obtained as a 25 wt % solution in water from Alfa Aesar, Ward Hill, Mass.

"TMACl" refers to tetramethylammonium chloride, obtained as a 5 M solution in water from Sigma-Aldrich, St. Louis, Mo.

"IPA" refers to 2-propanol, obtained from VWR, West Chester, Pa.

Preparative Example 1 (PE-1)

Preparation of PDADMAC Coating Solution for Layer-by-Layer (LbL) Coating

A coating solution of PDADMAC at a concentration of 20 mM (with respect to the repeat unit) was made by first adding 56.5 g of PDADMAC (20 wt % in water) to a 4 L plastic jug. Deionized (DI) water was then added to a mass of 3499.5 g and the solution was stirred with a magnetic stir bar for 30 min. Approximately 0.5 mL of TMAOH (25 wt % in water) was added to adjust the pH of the solution to 10.0.

Preparative Example 2 (PE-2)

Preparation of $SiO_2$ Nanoparticle Coating Solution for Layer-by-Layer (LbL) Coating A coating solution of $SiO_2$ nanoparticles at a concentration of 9.6 g/L (with 48 mM TMACl) was made by first adding 84 g of $SiO_2$ (40 wt % in water) to a 4 L plastic jug. Deionized water was then added to a mass of 3457.4 g. A volume of 33.6 mL of TMACl (5 M in water) was then added dropwise with stirring. Approximately 9.0 mL of TMAOH (25 wt % in water) was added dropwise to adjust the pH of the solution to 11.5.

Preparative Example 3 (PE-3)

Preparation of $TiO_2$ Nanoparticle Coating Solution for Layer-by-Layer (LbL) Coating A coating solution of $TiO_2$ nanoparticles at a concentration of 10 g/L (with 65 mM TMACl) was made by first adding 350 g of $TiO_2$ (10 wt % in water) to a 4 L plastic jug. Deionized water was then added to a mass of 3452.0 g. A volume of 45.5 mL of TMACl (5 M in water) was then added dropwise with stirring. Approximately 2.5 mL of TMAOH (25 wt % in water) was added dropwise to adjust the pH of the solution to 11.5.

Preparative Example 4 (PE-4)

Preparation of PET Film with a Sacrificial Release Layer

The substrate used in these examples was a 2 mil PET film coated with 6 micron thick PMMA copolymer (75 wt % methyl methacrylate, 25 wt % ethyl acrylate, "PRID510-A", Altuglas Inc., Bristol, Pa.) from a 20 wt % solution of the copolymer in 2-butanone using a roll-to-roll web coating process.

Preparative Example 5 (PE-5)

Preparation of Pressure Sensitive Adhesive Coating Solution

The pressure-sensitive adhesive coating solution comprised (isooctyl acrylate (IOA)/acrylic acid (AA)(93/7), as described in U.S. RE24,906 (Ulrich was diluted from 54 wt % in ethyl acetate/heptane to 15 wt % with 1-butanol.

Method for Determining the pH of the Coating Solutions

The pH of the solutions used for coating was determined using a VWR sympHony® rugged bulb pH electrode connected to a VWR sympHony® pH meter. Standard buffer solutions were used for calibration.

Method for Determining the Thickness and Refractive Index of Coatings

The thickness and refractive index of layer-by-layer self-assembled coatings on glass were measured using a variable angle spectroscopic ellipsometer (M-2000VI®, J. A. Woollamn Co., Inc., Lincoln, Nebr.). Scotch® Magic™ Tape (3M Company, St. Paul, Minn.) with matte finish was applied to the backside of the substrates in order to suppress backside reflections. Ellipsometric data were acquired from 370-1690 nm at incident angles of 50°, 60°, and 70°. The optical model used to describe the sample consisted of a Cauchy layer for the glass slide substrate and a separate Cauchy layer for the layer-by-layer coating. In some cases, a surface roughness layer was added to the optical model to improve the fit to the data. WVASE32 software was utilized to fit the model parameters (thickness and Cauchy parameters) to the experimental data.

Method for Determining Visible Transmittance and Reflectance of Coatings

Unless otherwise specified, the visible light transmittance (% T) and reflectance (% R) of coatings on glass were measured with a LAMBDA 1050 UV/Vis/NIR spectrometer with an integrating sphere (obtained from Perkin Elmer, Inc. Waltham, Mass.). For reflectance measurements, black electrical tape (3M Company, St. Paul, Minn.) was laminated to the backside of the samples to eliminate backside reflection.

General Method for Preparing Layer-by-Layer Coatings

Layer-by-layer self-assembled coatings were made using an apparatus purchased from Svaya Nanotechnologies, Inc. (Sunnyvale, Calif.) and modeled after the system described in U.S. Pat. No. 8,234,998 (Krogman et al.) as well as Krogman et al. Automated Process for Improved Uniformity and Versatility of Layer-by-Layer Deposition, Langmuir 2007, 23, 3137-3141. The apparatus comprises pressure vessels loaded with the coating solutions. Spray nozzles with a flat spray pattern (from Spraying Systems, Inc., Wheaton, Ill.) are mounted to spray the coating solutions and rinse water at specified times, controlled by solenoid valves. The pressure vessels (Alloy Products Corp., Waukesha, Wis.) containing the coating solutions are pressurized with nitrogen to 30 psi, while the pressure vessel containing DI water is pressurized with air to 30 psi. The substrate (12"×12") is subjected to an air corona treatment using a handheld BD-20AC Laboratory Corona Treater (Electro-Technic Products, Inc., Chicago, Ill.) and is then mounted on a vertical translation stage and held in place with a vacuum chuck. In a typical coating sequence, the polycation (e.g. PDADMAC) solution is sprayed onto the substrate while the stage moves vertically downward at 76 mm/sec. Next, after a dwell time of ~4 sec, the DI water solution is sprayed onto the substrate while the stage moves vertically upward at 102 mm/sec. Next, after a dwell time of ~4 sec, the polyanion (e.g. $SiO_2$ or $TiO_2$) solution is sprayed onto the substrate while the stage moves vertically downward at 76 mm/sec. Finally, after a dwell time of ~4 sec, the DI water solution is sprayed onto the substrate while the stage moves vertically upward at 102 mm/sec. The above sequence is repeated to deposit a desired number of "bi-layers". The coatings are generally denoted as (Polycation/Polyanion, where x is the number of deposited "bi-layers". A "bi-layer" refers to the combination of a polycation layer and a polyanion layer. A polycation layer can comprise polycationic polymers or nanoparticles. Similarly, a polyanion layer can comprise polyanionic polymers or nanoparticles. Coatings are dried with compressed air or nitrogen following the coating process.

Example 1 (EX-1)

Layer-by-layer coating to make a transfer film. Single sided antireflective (AR) coating on glass following application of the transfer film.

A $(PDADMAC/SiO_2)_6$ (i.e., one protolayer with 6 sub-protolayer pairs) layer-by-layer coating was deposited utilizing the "General Method for Preparing Layer-by-Layer Coatings" onto a PET substrate with a co-PMMA release layer as described in Preparative Example 4 (PE-4) above. The protolayer has a visible light transmittance of 92.5% as measured with a HazeGard Plus (BYK-Gardner USA, Columbia, Md.). On top of the layer-by-layer coating, a pressure sensitive adhesive coating solution (described in Preparative Example 5 (PE-5) above) was applied using a wire-wound rod (Mayer Rod No. 25, wet film thickness of 57.15 μm, obtained from RD Specialties, Webster, N.Y.). The adhesive coating was then dried in an oven at 150° C. for 10 min. A roughly 1"×2" piece of this transfer film was laminated using an adhesive roller to a 1.5"×3"×1.0 mm glass slide (Fisherbrand Plain Miscroscope Slide, Pre-cleaned, Hampton, N.H.). Prior to lamination, the glass slide was cleaned with IPA, then DI $H_2O$, and dried under a stream of nitrogen. After lamination, the PET backing was peeled away leaving the adhesive layer, the layer-by-layer coating, and the co-PMMA sacrificial release layer on the glass substrate. The glass was then placed in a furnace (Sybron Thermolyne Model 1300, Barnstead/Thermolyne Corp., Dubuque, Iowa) where the temperature was ramped to 550° C. at ~35° C./min, held isothermally for 1 hr, and cooled passively back to room temperature.

The thickness of the coating on glass was measured to be 99.7 nm, and the refractive index of the coating at 550 nm was measured to be 1.26 utilizing the "Method for Determining the Thickness and Refractive Index of Coatings" above. Utilizing the "Method for Determining Visible Transmittance and Reflectance of Coatings" described above, the average % T in the visible range (400-700 nm) was 95.1%. For comparison, an uncoated glass slide has an average transmission in the visible range (400-700 nm) of 91.6% T. This AR coating has a faint blue color in reflection.

Example 2 (EX-2)

Double sided AR coating on glass following application of transfer films.

Figure 3:
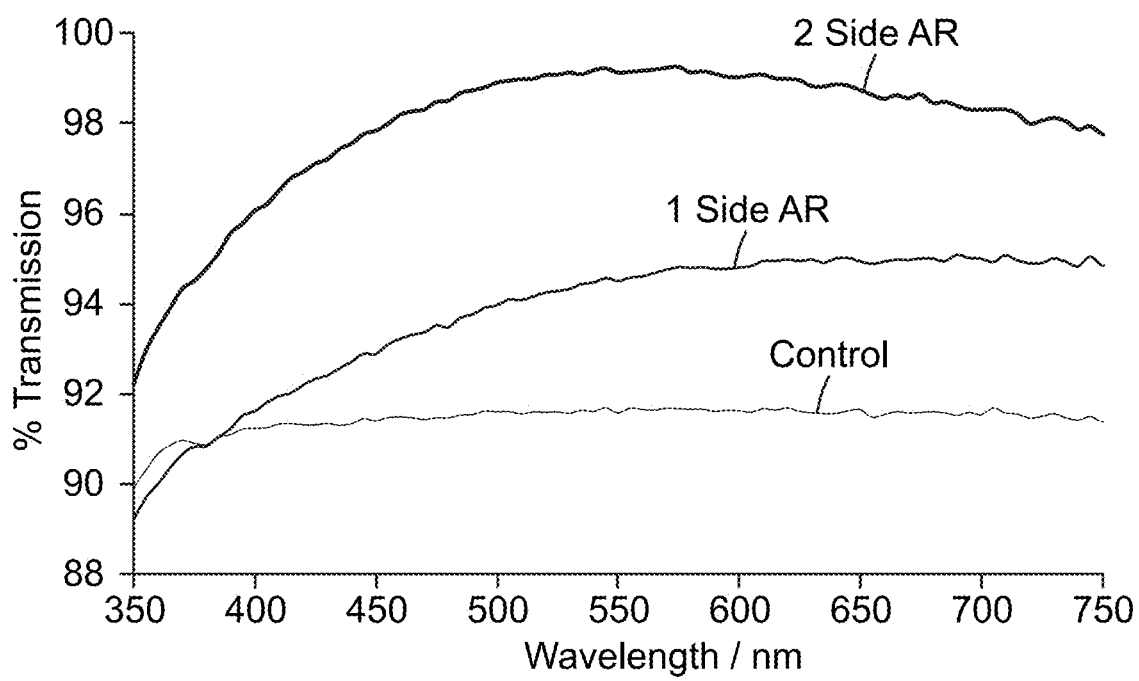
FIG. 3 is a graph of the transmission spectra of the single sided AR coating from EX-1, the double sided AR coating from EX-2, and a control uncoated piece of glass.

Two pieces (~1"×2") of the transfer film described in Example 1 were laminated using an adhesive roller to opposite sides of a cleaned 1.5"×3"×1.0 mm glass slide (Fisherbrand Plain Miscroscope Slide, Precleaned, Hampton, N.H.). After lamination, the PET backings were removed and the sample was placed in a furnace (Sybron Thermolyne Model 1300, Barnstead/Thermolyne Corp., Dubuque, Iowa). The temperature was ramped to 550° C. at ~35° C./min, held isothermally for 1 hr, and cooled passively back to room temperature. Utilizing the "Method for Determining Visible Transmittance and Reflectance of Coatings" described above, the average % T in the visible range (400-700 nm) was 98.5% T. For comparison, an uncoated glass slide has an average % T in the visible range (400-700 nm) of 91.6% T. FIG. 3 shows the transmission spectra of the single sided AR coating from EX-1, the double sided AR coating from EX-2, and a control uncoated piece of glass.

Example 3 (EX-3)

Layer-by-layer coating to make a transfer film. Broadband anti-reflective (BBAR) coating on glass following application of the transfer film.

A [(PDADMAC/SiO$_2$)$_7$(PDADMAC/TiO$_2$)$_2$(PDADMAC/SiO$_2$)$_3$(PDADMAC/TiO$_2$)$_2$ (i.e., four protolayers with a total of 14 sub-protolayer pairs) layer-by-layer coating was deposited utilizing the "General Method for Preparing Layer-by-Layer Coatings" onto a PET substrate with a co-PMMA release layer as described in Preparative Example 4 (PE-4) above. The optical protolayer stack has a visible light transmittance of 90.1% as measured with a HazeGard Plus (BYK-Gardner USA, Columbia, Md.). On top of the layer-by-layer coating, a pressure sensitive adhesive coating solution (described in Preparative Example 5 (PE-5) above) was applied using a wire-wound rod (Mayer Rod No. 25, wet film thickness of 57.15 μm, obtained from RD Specialties, Webster, N.Y.). The adhesive coating was then dried in an oven at 150° C. for 10 min. A roughly 1"×2" piece of this transfer film was laminated using an adhesive roller to a 1.5"×3"×1.0 mm glass slide (Fisherbrand Plain Miscroscope Slide, Precleaned, Hampton, N.H.). Prior to lamination, the glass slide was cleaned with IPA, then DI H$_2$O, and dried under a stream of nitrogen. After lamination, the PET backing was peeled away leaving the adhesive layer, the layer-by-layer coating, and the co-PMMA sacrificial release layer on the glass substrate. The glass was then placed in a furnace (Sybron Thermolyne Model 1300, Barnstead/Thermolyne Corp., Dubuque, Iowa) where the temperature was ramped to 550° C. at ~35° C./min, held isothermally for 1 hr, and cooled passively back to room temperature.

Figure 4:
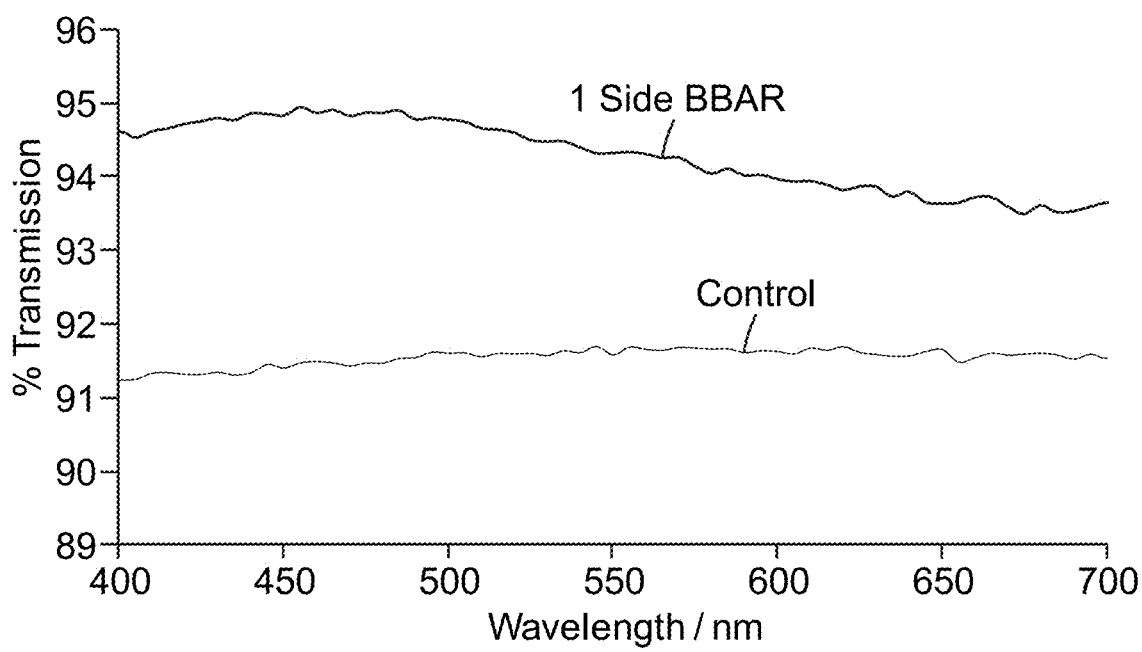
FIG. 4 is a graph of the transmission spectra of glass slides, after bake-out, with a 1-sided BBAR coating from EX-3 and an uncoated control.

Utilizing the "Method for Determining Visible Transmittance and Reflectance of Coatings" described above, the average % T in the visible range (400-700 nm) was 94.3% T. For comparison, an uncoated glass slide has an average % T in the visible range (400-700 nm) of 91.6% T. This BBAR coating has a faint brown color in reflection. FIG. 4 is a graph of the transmission spectra of glass slides, after bake-out, with a 1-sided BBAR coating from EX-3 and an uncoated control.

Example 4 (EX-4)

AR coating on sapphire following application of a transfer film.

One piece (~0.75"×0.75") of the transfer film described in Example 1 was laminated with an adhesive roller to one side of a sapphire disc (3 cm diameter, 3.5 mm thick) (Rubicon Technology, Bensenville, Ill.). Prior to lamination, the sapphire was cleaned with IPA and DI H$_2$O, and then dried under a stream of nitrogen. After lamination, the PET backing was removed and the sample was placed in a furnace (Sybron Thermolyne Model 1300, Barnstead/Thermolyne Corp., Dubuque, Iowa). The temperature was ramped to 550° C. at ~35° C./min, held isothermally for 1 hr, and cooled passively back to room temperature.

Figure 5:
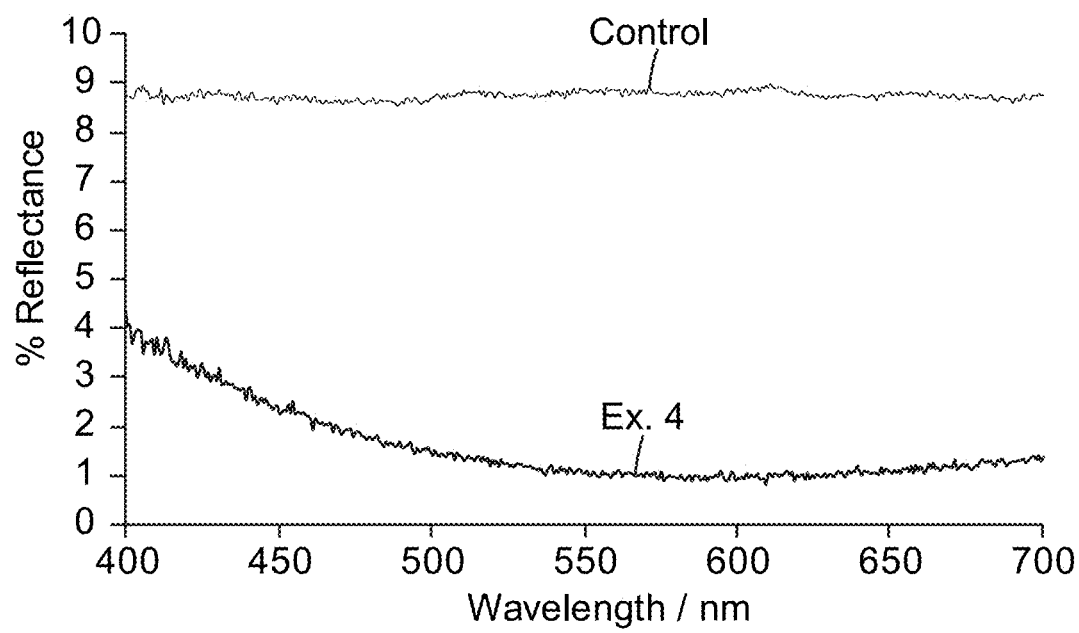
FIG. 5 is a graph of the front surface reflection spectrum of EX-4 with a control of bare, uncoated sapphire.

Utilizing the "Method for Determining Visible Transmittance and Reflectance of Coatings" described above, the average % T in the visible range (400-700 nm) was 89.1% T. For comparison, an uncoated sapphire disc has an average % T in the visible range (400-700 nm) of 85.5% T. A front surface reflection spectrum, acquired with a Filmetrics F10-AR reflectometer (San Diego, Calif.), is shown in FIG. 5 with a control of bare, uncoated sapphire.

Example 5 (EX-5)

Layer-by-layer coating to make a transfer film. A high refractive index coating on glass following application of the transfer film.

A (PDADMAC/TiO$_2$)$_{12}$ (i.e., one protolayer with 12 sub-protolayer pairs) layer-by-layer coating was deposited utilizing the "General Method for Preparing Layer-by-Layer Coatings" onto a PET substrate with a co-PMMA release layer as described in Preparative Example 4 (PE-4) above. The protolayer has a visible light transmittance of 82.0% as measured with a HazeGard Plus (BYK-Gardner USA, Columbia, Md.). On top of the layer-by-layer coating, a pressure sensitive adhesive coating solution (described in Preparative Example 5 (PE-5) above) was applied using a wire-wound rod (Mayer Rod No. 25, wet film thickness of 57.15 μm, obtained from RD Specialties, Webster, N.Y.). The adhesive coating was then dried in an oven at 150° C. for 10 min. A roughly 1"×2" piece of this transfer film was laminated with an adhesive roller to a 1.5"×3"×1.0 mm glass slide (Fisherbrand Plain Miscroscope Slide, Precleaned, Hampton, N.H.). Prior to lamination, the glass slide was cleaned with IPA, then DI H$_2$O, and dried under a stream of nitrogen. After lamination, the PET backing was peeled away leaving the adhesive layer, the layer-by-layer coating, and the co-PMMA sacrificial release layer on the glass substrate. The glass was then placed in a furnace (Sybron Thermolyne Model 1300, Barnstead/Thermolyne Corp., Dubuque, Iowa) where the temperature was ramped to 550° C. at ~35° C./min, held isothermally for 1 hr, and cooled passively back to room temperature.

The thickness of the coating on glass was measured to be 82.1 nm, and the refractive index of the coating at 550 nm was measured to be 2.09 utilizing the "Method for Determining the Thickness and Refractive Index of Coatings" above. Utilizing the "Method for Determining Visible Transmittance and Reflectance of Coatings" described above, the maximum reflectance observed was 20.2% R at 640 nm. The average % R in the visible range (400-700 nm) was 17.3% R. For comparison, an uncoated glass slide has an average % R in the visible range (400-700 nm) of 4.2% R.

Example 6 (EX-6)

Layer-by-layer coating to make a transfer film. A Bragg reflector coating on glass following application of the transfer film.

Figure 6:
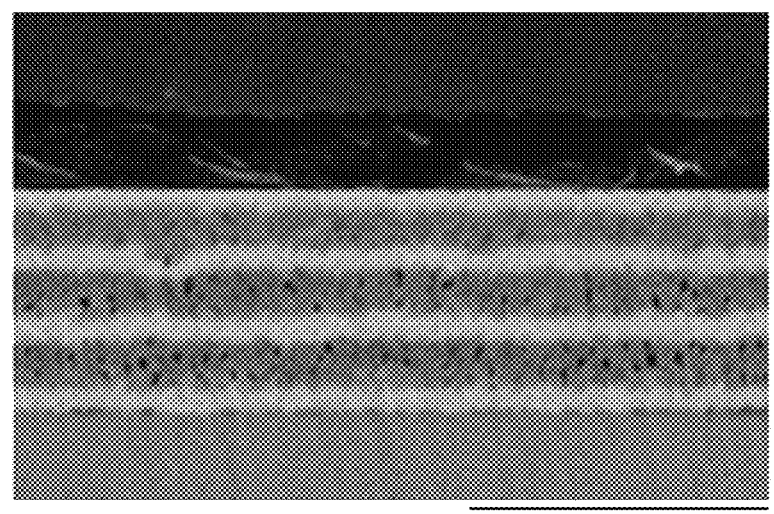
FIG. 6 is a cross-sectional SEM image of a 7-layer stack Bragg reflector on glass following lamination, transfer and bake-out.

A [(PDADMAC/TiO$_2$)$_6$(PDADMAC/SiO$_2$)$_6$]$_3$(PDADMAC/TiO$_2$)$_6$ (i.e., seven protolayers with a total of 42 sub-protolayer pairs) layer-by-layer coating was deposited utilizing the "General Method for Preparing Layer-by-Layer Coatings" onto a PET substrate with a co-PMMA release layer as described in Preparative Example 4 (PE-4) above. The optical protolayer stack has a visible light transmittance of 46% as measured with a HazeGard Plus (BYK-Gardner USA, Columbia, Md.). On top of the layer-by-layer coating, a pressure sensitive adhesive coating solution (described in Preparative Example 5 (PE-5) above) was applied using a wire-wound rod (Mayer Rod No. 25, wet film thickness of 57.15 µm, obtained from RD Specialties, Webster, N.Y.). The adhesive coating was then dried in an oven at 150° C. for 10 min. A roughly 1"×2" piece of this transfer film was laminated with an adhesive roller to a 1.5"×3"×1.0 mm glass slide (Fisherbrand Plain Miscroscope Slide, Precleaned, Hampton, N.H.). Prior to lamination, the glass slide was cleaned with IPA, then DI $H_2O$, and dried under a stream of nitrogen. After lamination, the PET backing was peeled away leaving the adhesive layer, the layer-by-layer coating, and the co-PMMA sacrificial release layer on the glass substrate. The glass was then placed in a furnace (Sybron Thermolyne Model 1300, Barnstead/Thermolyne Corp., Dubuque, Iowa) where the temperature was ramped to 550° C. at ~35° C./min, held isothermally for 1 hr, and cooled passively back to room temperature. FIG. 6 is a cross-sectional scanning electron microscopy (SEM) image of a 7-layer stack Bragg reflector on glass following lamination, transfer and bake-out. The lighter colored layers are the $TiO_2$ layers and the darker colored layers are the $SiO_2$ layers.

Figure 7:
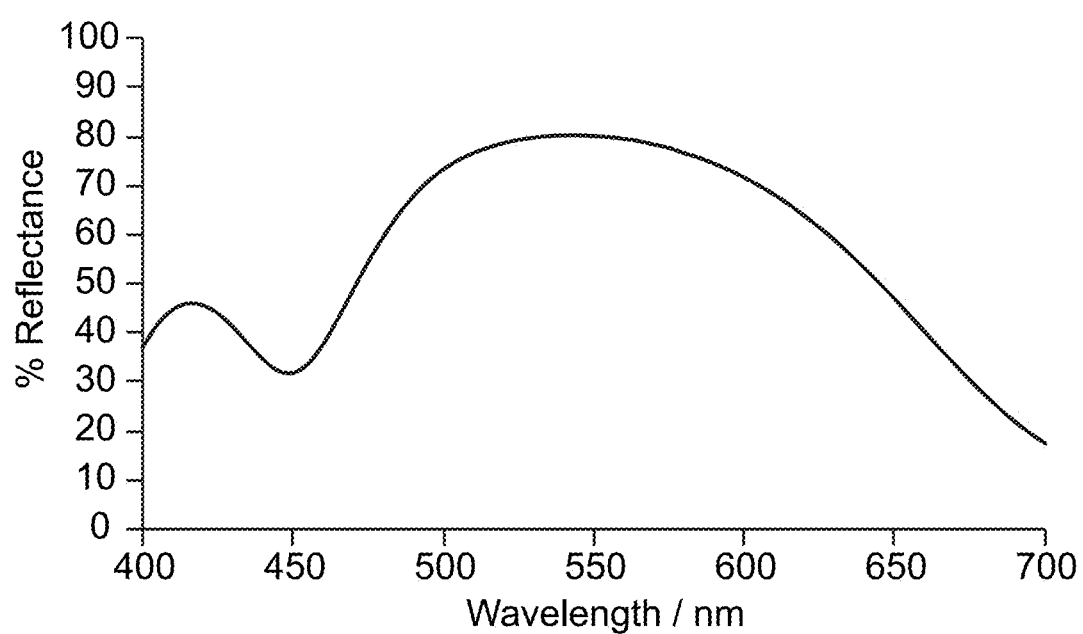
FIG. 7 is a graph of the reflectance spectrum of a 7-stack Bragg reflector on glass following lamination, transfer and bake-out of EX-6.

Utilizing the "Method for Determining Visible Transmittance and Reflectance of Coatings" described above, the maximum reflectance observed was 80.2% R at 545 nm. The average % R in the visible range (400-700 nm) was 56.3% R. For comparison, an uncoated glass slide has an average % R in the visible range (400-700 nm) of 4.2% R. FIG. 7 is graph of the reflectance spectrum of this 7-stack Bragg reflector on glass following lamination, transfer and bake-out.

Thus, embodiments of LAYER-BY-LAYER ASSEMBLED INORGANIC MULTILAYER LAMINATION TRANSFER FILMS are disclosed.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed is:

1. A transfer film comprising:
a protolayer stack including a first protolayer and a second protolayer, the first and second protolayers each having a uniform thickness of less than 1 micrometer and comprising a plurality of sub-protolayer pairs, each sub-protolayer pair formed by layer-by-layer self-assembly and independently comprising a material with a first bonding group and a material with a complementary second bonding group;
at least one of the materials in the sub-protolayer pairs of the first protolayer is a first thermally stable material comprising a first inorganic nanomaterial;
at least one of the materials in the sub-protolayer pairs of the second protolayer is a second thermally stable material comprising a second inorganic nanomaterial, wherein the first inorganic nanomaterial and second inorganic nanomaterial have a refractive index difference of at least 0.2; and
at least one of the materials in the sub-protolayer pairs of the first protolayer and the second protolayer comprises a sacrificial material,
wherein the transfer film further comprises a polymeric support layer, the polymeric support layer including a sacrificial material which remains on the protolayer stack following release from the polymeric support layer during the transfer process.

2. The transfer film according to claim 1, wherein the protolayer has a visible light transmittance of at least 5%.

3. The transfer film according to claim 1, wherein at least selected sub-protolayer pairs comprise inorganic nanomaterial having an average size of less than 100 nm.

4. The transfer film according to claim 1, wherein the material with a first bonding group is a polycationic material and the material with a complementary second bonding group is a polyanionic material.

5. The transfer film according to claim 1, wherein the material with a first bonding group is a hydrogen bond donor and the material with a complementary second bonding group is a hydrogen bond acceptor.

6. The transfer film according to claim 1, wherein the first thermally stable material is present in the first protolayer in an amount of at least 50 wt %.

7. A method, comprising:
laminating a transfer film according to claim 1 to a receptor substrate;
baking out the sacrificial material in the protolayer to form an optical stack having one or more layers.

8. The method according to claim 7, wherein the receptor substrate comprises glass, quartz or sapphire.

9. The method according to claim 7, wherein the each layer of the optical stack has a uniform thickness of less than 500 nanometers.

10. The method according to claim 7, wherein the optical stack has a visible light transmittance of at least 10%.

11. The method according to claim 7, wherein the optical stack comprises at least 4 layers.

12. The transfer film of claim 1,
wherein one of the materials in each sub-protolayer pair comprises a sacrificial material, and
wherein after removal of the sacrificial materials by bake-out the transfer film is suitable for use an antireflective film having a transmittance of at least 90%.

13. The transfer film of claim 1, wherein the sacrificial material is at least one of poly(methyl methacrylate) and poly(ethyl acrylate-co-methyl methacrylate).

14. The transfer film of claim 1, wherein the transfer film further comprises an adhesive layer.

* * * * *

UNITED STATES PATENT AND TRADEMARK OFFICE
CERTIFICATE OF CORRECTION

PATENT NO. : 11,247,501 B2
APPLICATION NO. : 14/470298
DATED : February 15, 2022
INVENTOR(S) : Schmidt et al.

Page 1 of 1

It is certified that error appears in the above-identified patent and that said Letters Patent is hereby corrected as shown below:

In the Claims

<u>Column 20</u>
Line 51, In Claim 12, delete "for use an", and insert -- for use as an --, therefor.

Signed and Sealed this
Twenty-sixth Day of April, 2022

Katherine Kelly Vidal
*Director of the United States Patent and Trademark Office*